(12) United States Patent
Baldwin et al.

(10) Patent No.: US 8,347,491 B1
(45) Date of Patent: Jan. 8, 2013

(54) SYSTEM OF ADJUSTABLY MOUNTING AN ELECTRICAL DEVICE

(75) Inventors: Jeffrey P. Baldwin, Phoenix, AZ (US); Richard L. Cleghorn, Tempe, AZ (US); Nathaniel A. Falendysz, Glendale, AZ (US); Marcus J. Shotey, Scottsdael, AZ (US)

(73) Assignee: Hubbell Incorporated, Shelton, CT (US)

( * ) Notice: Subject to any disclaimer, the term of this patent is extended or adjusted under 35 U.S.C. 154(b) by 519 days.

(21) Appl. No.: 12/577,648

(22) Filed: Oct. 12, 2009

Related U.S. Application Data

(60) Provisional application No. 61/182,805, filed on Jun. 1, 2009, provisional application No. 61/245,371, filed on Sep. 24, 2009.

(51) Int. Cl.
*B23P 19/00* (2006.01)

(52) U.S. Cl. ............... 29/758; 29/745; 29/756; 29/764; 174/50; 174/53; 174/57; 174/58; 174/520

(58) Field of Classification Search ............... 29/758, 29/745, 756, 761, 764; 174/50, 53, 57, 58, 174/66, 520, 565
See application file for complete search history.

(56) References Cited

U.S. PATENT DOCUMENTS

| | | | |
|---|---|---|---|
| 1,275,692 A | 8/1918 | Hubbell | |
| 1,345,502 A | 7/1920 | Newton | |
| 3,689,864 A | 9/1972 | Glader | |
| 4,909,692 A | 3/1990 | Hendren | |
| 5,012,043 A | 4/1991 | Seymour | |
| 5,108,243 A | 4/1992 | Antonucci | |
| 5,866,845 A | 2/1999 | Markiewicz | |
| 5,921,737 A | 7/1999 | Ibey | |
| 6,051,785 A | 4/2000 | Baldwin | |
| 6,175,078 B1 | 1/2001 | Bambardekar | |
| 6,307,154 B1 | 10/2001 | Gretz | |
| 6,468,107 B1 | 10/2002 | Nice | |
| 6,820,760 B2 | 11/2004 | Wegner | |
| 6,875,922 B1 | 4/2005 | Petak | |
| 6,953,894 B2 | 10/2005 | Ungerman | |
| 6,956,172 B2 * | 10/2005 | Dinh | ............................... 174/58 |
| 7,002,076 B2 | 2/2006 | Ungerman | |
| 7,052,314 B1 | 5/2006 | Rose | |
| 7,077,280 B1 | 7/2006 | Gretz | |
| 7,112,743 B2 | 9/2006 | Hull | |
| 7,193,154 B1 | 3/2007 | Connelly | |
| 7,312,395 B1 | 12/2007 | Gretz | |

(Continued)

FOREIGN PATENT DOCUMENTS

CA 2525352 5/2006

*Primary Examiner* — Thiem Phan
(74) *Attorney, Agent, or Firm* — Booth Udall, PLC

(57) ABSTRACT

An adjustably mounting electrical device with one or more fixed yokes located perpendicularly to a face of the electrical device, one or more moveable yokes located perpendicularly to the face of the electrical device, and one or more adjustment screws inserted through the one or more fixed yokes and threaded into the one or more moveable yokes, the one or more adjustment screws capable of moving the one or more moveable yokes perpendicularly to the face of the electrical device. The system may comprise mounting flanges that may have threaded hubs or the system may further comprise an electric device having front and back shells moveable on a track in response to depression of a button allowing for movement of the back shell so that the electric device may be mounted having its front face coplanar with a front wall surface.

8 Claims, 12 Drawing Sheets

U.S. PATENT DOCUMENTS

| | | |
|---|---|---|
| 7,378,591 B2 | 5/2008 | Dinh |
| 7,410,072 B2 | 8/2008 | Wegner |
| 7,494,371 B2 | 2/2009 | Kidman |
| 7,531,743 B2 | 5/2009 | Johnson et al. |
| 7,544,889 B1 | 6/2009 | Sanchez |
| 7,572,977 B2 | 8/2009 | Gorman |
| 7,582,827 B1 | 9/2009 | Gretz |
| 7,838,769 B2 * | 11/2010 | Peck ............................... 174/58 |

* cited by examiner

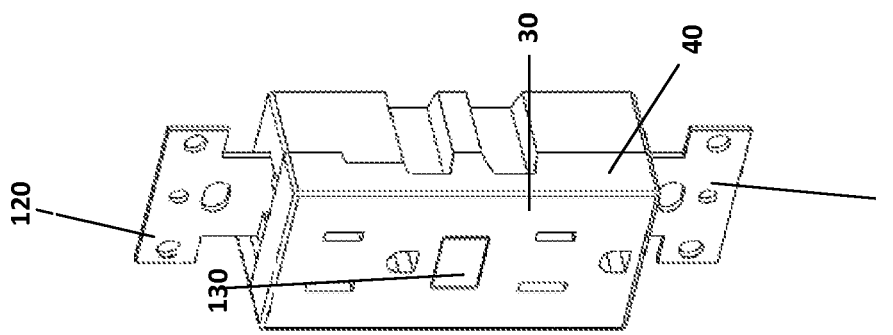
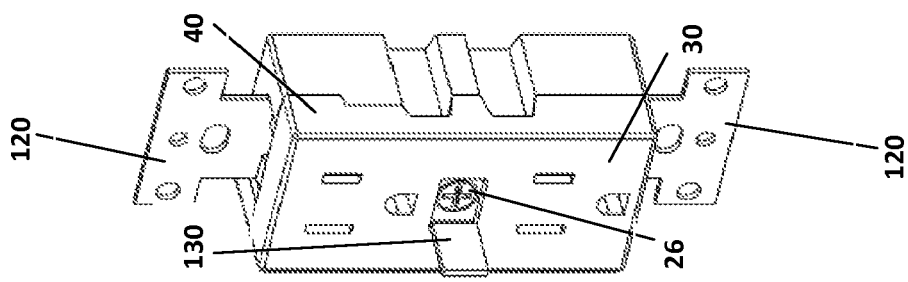
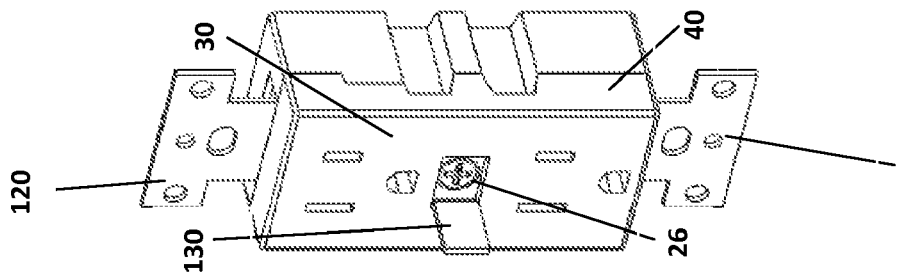
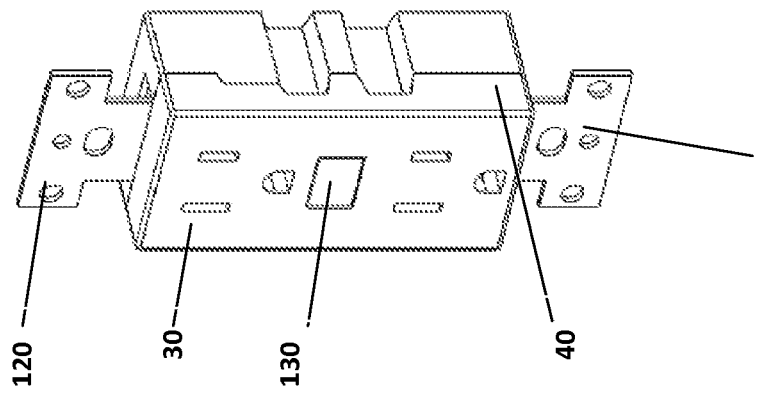
FIG. 8D
FIG. 8C
FIG. 8B
FIG. 8A

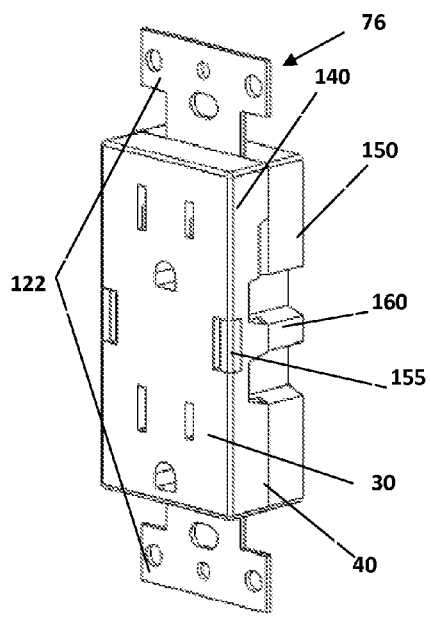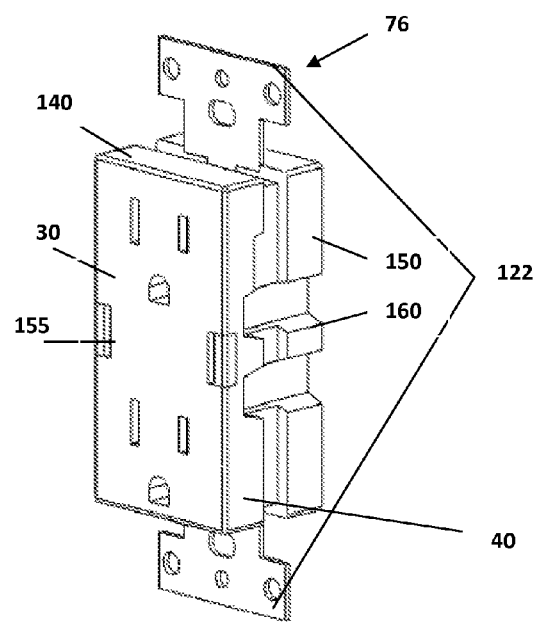
FIG. 9A                FIG. 9B
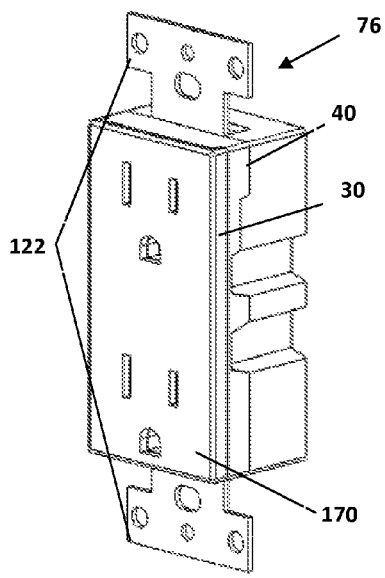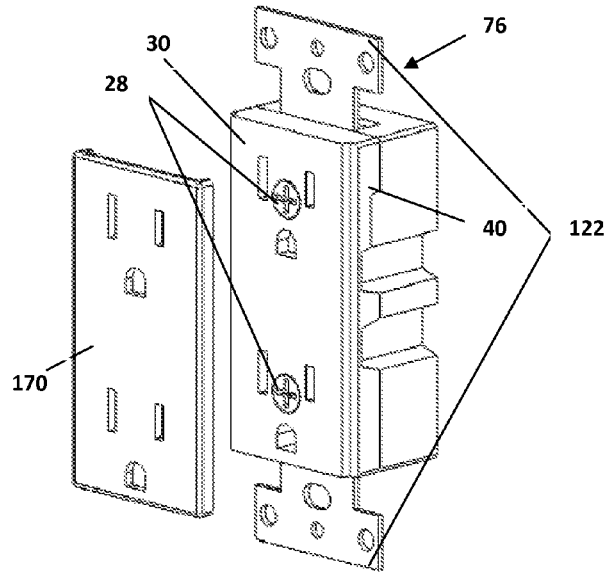
FIG. 10A               FIG. 10B

SYSTEM OF ADJUSTABLY MOUNTING AN ELECTRICAL DEVICE

CROSS REFERENCE TO RELATED APPLICATIONS

This application claims the benefit under 35 U.S.C. §119 (e) of U.S. Provisional Application Ser. No. 61/182,805, filed Jun. 1, 2009, entitled "Adjustable Electrical Device" and U.S. Provisional Application Ser. No. 61/245,371, filed Sep. 24, 2009, entitled "Adjustable Receptacles."

BACKGROUND

The present disclosure relates to mounting structures that allow for the adjustment of the installed depth of electrical devices.

This disclosure relates to electrical devices and boxes. Often times an electrical box is installed too far backward into the wall, not in compliance with the National Electrical Code which requires that boxes be installed such that the front face of the open end of the electrical box is flush or coplanar with the front face of the wall. Proper installation results in the yoke of an electrical device being coplanar with the front rim of the electrical box and flush with the face of the wall when the device is installed. Improper installation results in the yoke of the electrical device not being supported by the electrical box or not being flush with the face of the wall. When a faceplate, such as a wall plate or switch plate, is installed on the electrical device, the faceplate essentially becomes the sixth side of the electrical box. When the device is properly installed, the face of the electrical device extends through an opening in the faceplate so that there are no sizeable gaps between the electrical device and the faceplate that could expose the public to the electrical wiring within the box.

SUMMARY

The present disclosure describes, among other things, various applications of mounting structures that allow for the installed depth of electrical devices to be adjusted, preferably so that the yoke of the electrical device is coplanar with the front face of the wall surface in which an electrical box is installed.

This disclosure relates to a system that adjustably mounts an electrical device comprising: an electrical device; one or more fixed yokes located perpendicularly to a face of the electrical device; one or more moveable yokes located perpendicularly to the face of the electrical device; and one or more adjustment screws inserted through the one or more fixed yokes and threaded into the one or more moveable yokes, the one or more adjustment screws capable of moving the one or more moveable yokes perpendicularly to the face of the electrical device. The device may also be such that the one or more moveable yokes is capable of being adjusted so that the face of the electrical device is coplanar with a front face of a wall. Additionally, the device may have only one adjustment screw wherein the fixed and moveable yokes are attached to each other on a side of the device not having the adjustment screw. The device also may be configured such that the one or more fixed yokes has one or more tracks and the one or more moveable yokes has one or more rails, wherein the one or more tracks are interconnectable with the one or more rails.

This disclosure also relates to a system of adjustably mounting an electrical device comprising: an electrical device; an electrical device yoke comprising at least two or more box mounting flanges each configured for movement in a direction perpendicular to the electrical device face; one or more adjustments screws inserted perpendicular to the electrical device face, the one or more adjustment screws configured such that rotational movement of the one or more adjustment screws to adjustably moves the one or more at least two box mounting flanges in its positional relation to the electrical device face, in a direction perpendicular to the electrical device face.

The device may further have one or more flaps configured to move between an opened and a closed position or detachable tabs or a removable cover plate that attaches to the face of the electric device that conceals the adjustment screws from view. While the device may have multiple adjustment screws, it may also have only one adjustment screw located at about the center of the face of the electrical device. The mounting flanges of the device may also have one or more threaded hubs having one or more adjustment screws mounted inside the one or more threaded hubs and the back face of one or more of the threaded hubs may be aligned so that it is coincident with an electrical box.

This disclosure also relates to a system of adjustably mounting an electrical device comprising: an electrical device having a front shell and a back shell; one or more mounting flanges that are attached to the back shell; a track that is perpendicular to a front face of the front shell and runs between the front and back shells; and one or more depressable buttons located on one or more sides of the electrical device. The back shell is moveable along the track when the one or more depressable buttons is depressed.

This disclosure also relates to a system of adjustably mounting an electrical device further comprising one or more mounting screws located at or about the center of the moveable yoke that secure the electrical device to the electrical box and an one or more adjustment screws located at one or more points on the yoke that is laterally displaced from the location of the one or more mounting screws.

This disclosure also relates to a system of adjustably mounting an electrical device further comprising one or more threaded plate screw holes through which one or more plate screws is inserted wherein the one or more adjustment screws is configured to slidably move the one or more moveable yokes perpendicularly to the electrical device face so that the one or more plate screws is secured into the one or more threaded plate screw holes.

Aspects and applications of the disclosure presented here are described below in the drawings and the detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar.

Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . .," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

It will be understood that implementations are not limited to the specific components disclosed herein, as virtually any components consistent with the intended operation of a method and/or system implementation of adjustably mounting an electric device may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation of adjustably mounting an electric device.

The above embodiments, implementations and examples are given to explain some of the methods, assemblies and components for adjustably mounting an electric device. However, numerous changes or differences may be employed in various other implementations that still fall within the scope of the adjustably mounted electric device.

In places where the description above refers to particular implementations of an adjustably mounted electric device, it should be readily apparent that a number of modifications may be made without departing from the spirit thereof. The presently disclosed implementations are, therefore, to be considered in all respects as illustrative and not restrictive

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIGS. 8A-8D depict perspective views of adjustment of a second particular embodiment of an adjustable mounting electrical device;

FIGS. 9A & 9B depict perspective views of a third particular embodiment of an adjustable mounting electrical device.

FIGS. 10A-10D depict perspective views of a fourth particular embodiment of an adjustable mounting electrical device.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the disclosure. It will be understood, however, by those skilled in the relevant arts, that the present applications may be practiced without these specific details. In other instances, known structures and devices are shown or discussed more generally in order to avoid obscuring the applications. In many cases, a description of the operation is sufficient to enable one to implement the various forms of the invention. It should be noted that there are many different and alternative configurations, devices and technologies to which the disclosed applications may be applied. The full scope of the disclosure is not limited to the examples that are described below.

Although the particular implementations and embodiments shown in the Figures specifically illustrate rectangular electrical receptacles, this disclosure is applicable to all electrical devices that mount in electrical boxes in a wall, including but not limited to electrical receptacles, switches, dimmers and other devices. It is also intended that any of the electrical devices referred to in this disclosure be may be suitable for use with 110V, 220V, or any other applicable voltage, and for use with electrical devices of any shape and size.

Figure 1:
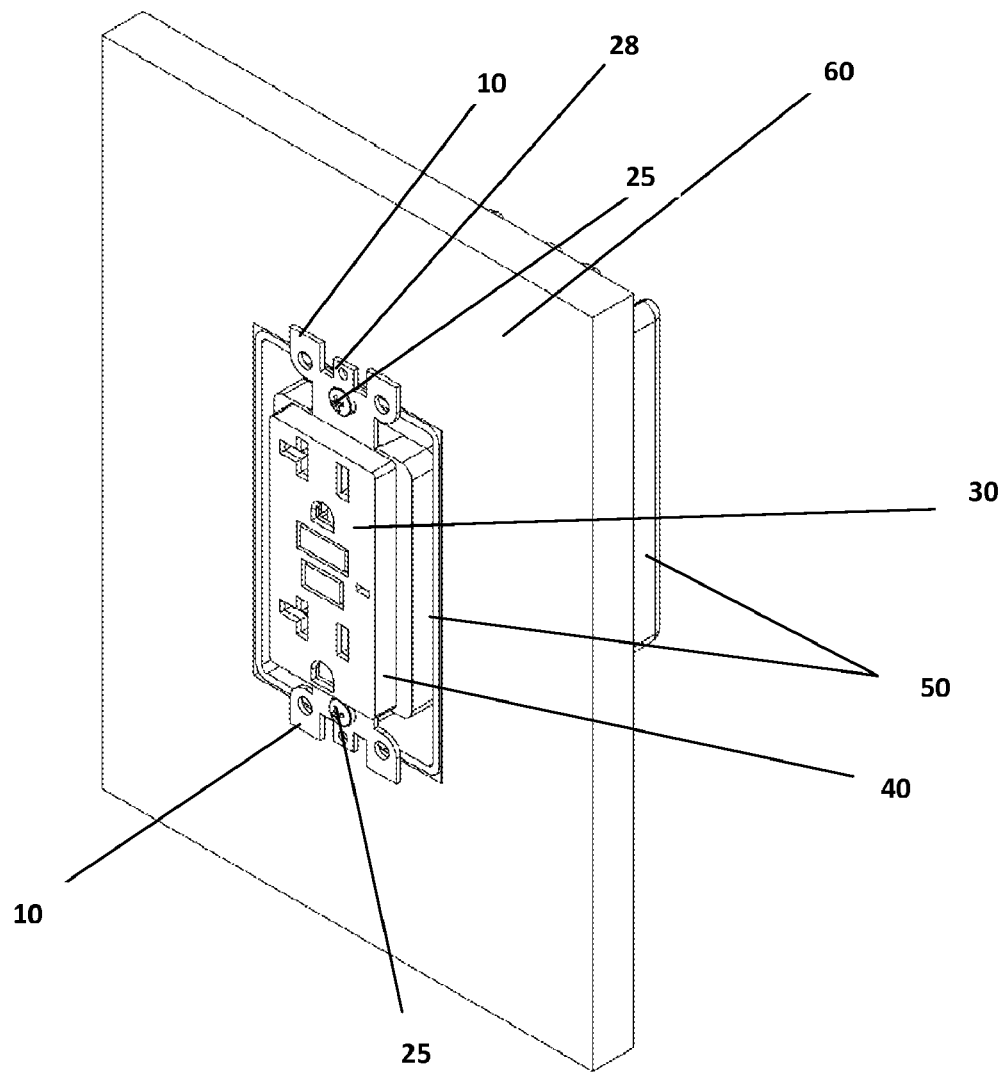
FIG. 1 depicts a proper installation of an electrical device.
Figure 2:
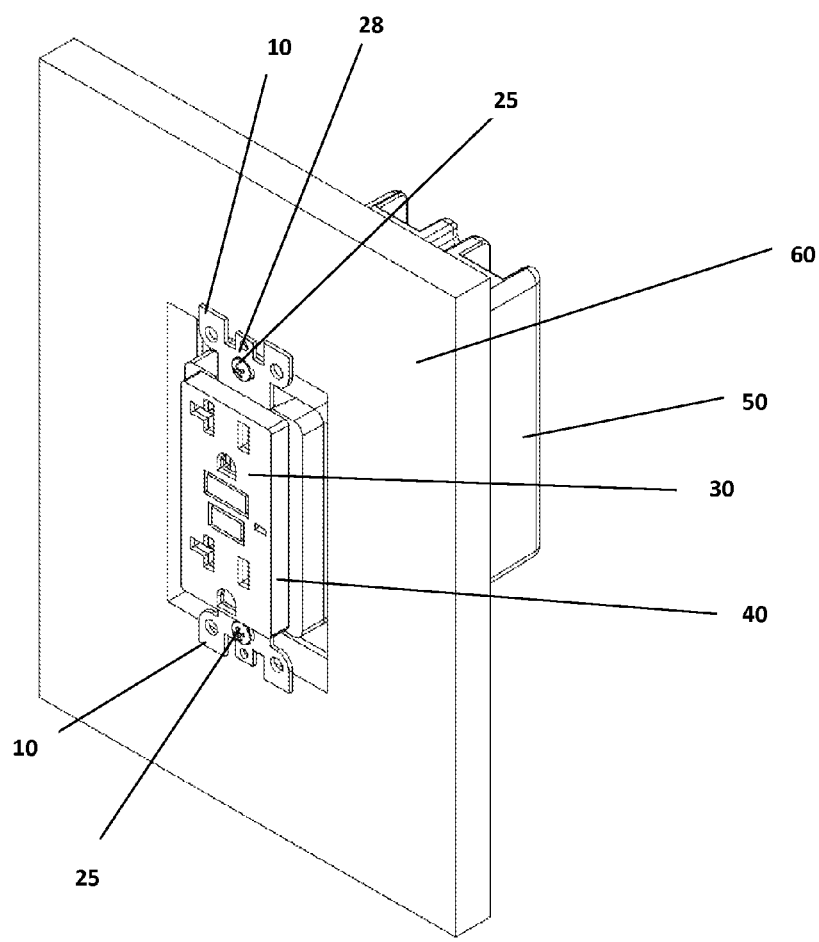
FIG. 2 depicts an improper installation.

FIG. 1 depicts a proper installation wherein an electrical box 50 is installed such that its front face is flush with the wall face 60 and an electrical device 40 is properly installed so that the faceplate of the electrical device will be flush with the wall face 60. By contrast, FIG. 2 shows a very common installation where the electrical box 50 is placed too far into the wall so that the front face of the electrical box is recessed below the wall face 60. This improper installation will result in the electrical box 50 not being in direct support of the yoke 10 of the electrical device 40 or the electrical device 40 being installed back into the wall 60 such that the faceplate leaves a gap between the faceplate and the face 30 of the electrical device 40. Among other problems resulting from this improper installation is that the yoke 10 of the electrical device 40 may bend as the box mounting screws 25 are tightened which may cause the face 30 of the electrical device 40 to move backward into the electrical box 50, thereby negatively affecting the aesthetics and safety of the final installation as the electrical device 40 by leaving a gap between the front face 30 of the electrical device 40 and the faceplate. Additionally, in cases where the yoke 10 is recessed back behind the wall face 60, the plate mounting screw aperture 28 also recesses behind the wall face 60. Plate mounting screws are conventionally very short screws and are used in situations, like that shown in FIGS. 1-2, where a ground fault current interrupt outlet (GFCI) or switch is used because it does not have a center mount screw aperture on the electrical device. As a result, if the yoke 10 is recessed behind the wall face 60 the plate mounting screw often cannot reach the threaded plate mounting screw hole unless the installation is done correctly or a longer replacement screw is used. Another possible problem is that the electrical device may not be solidly held in place, again causing safety issues.

Figure 12:
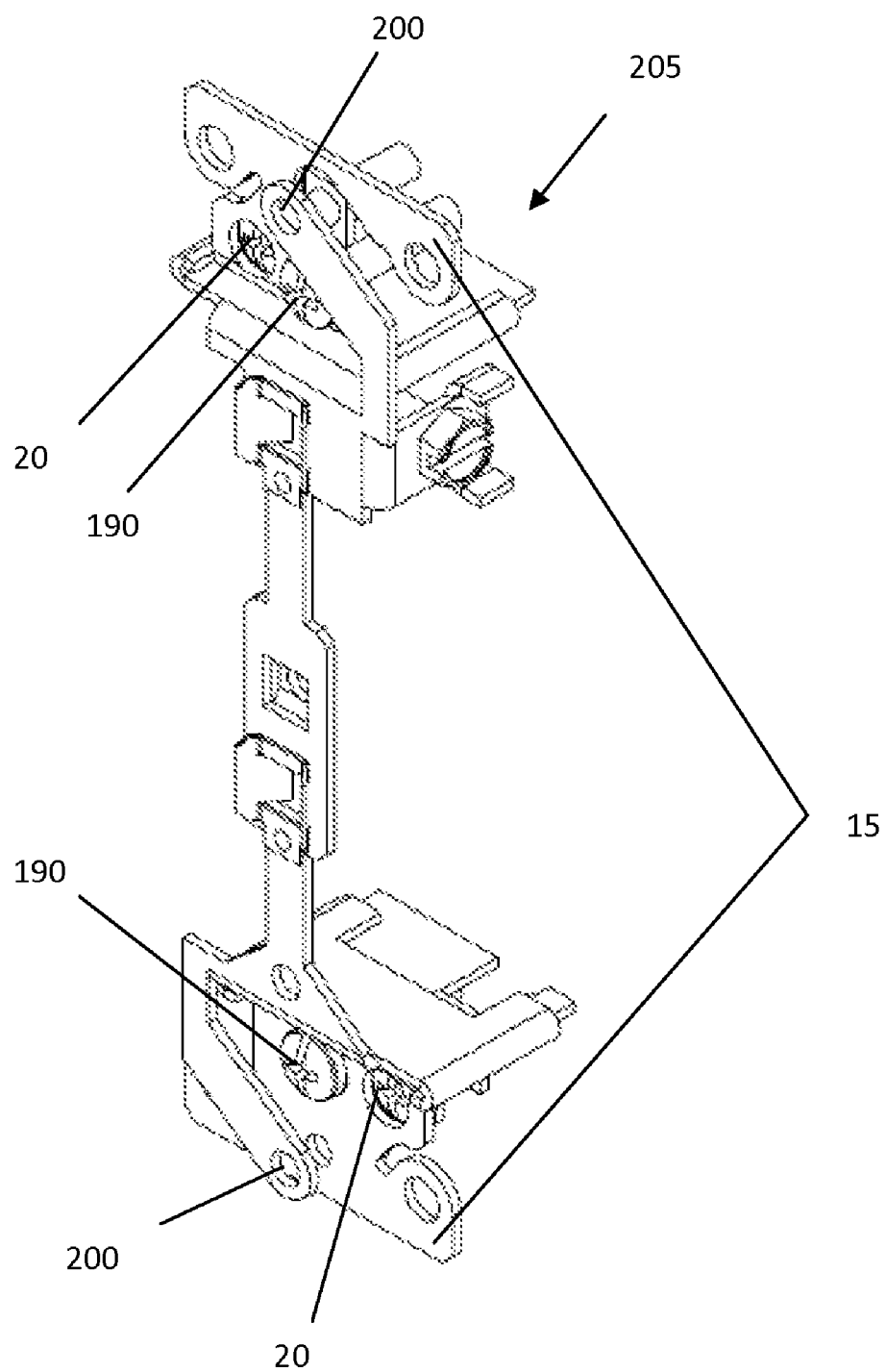
FIG. 12 depicts a sixth particular embodiment of a yoke for an adjustable mounting electrical device.
Figure 13:
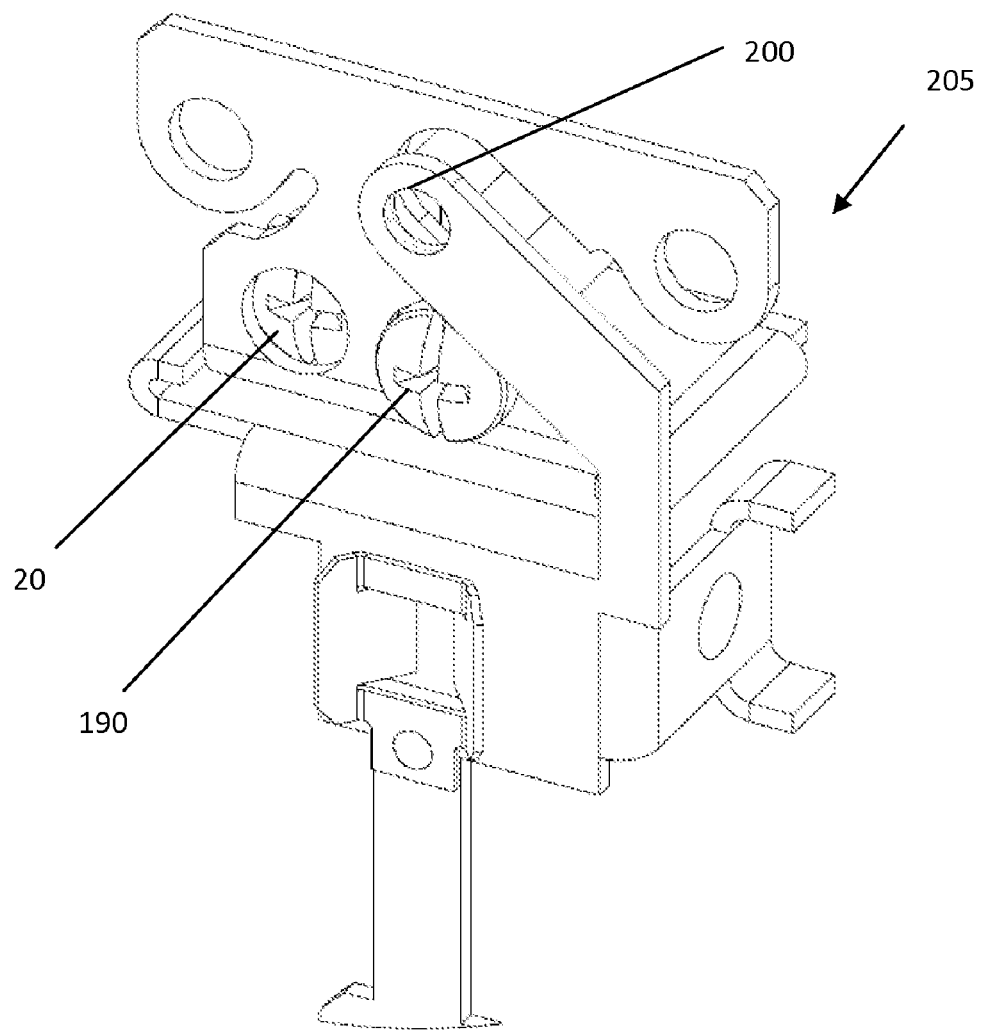
FIG. 13 depicts a close-up view of the yoke for the adjustable mounting electrical device of FIG. 12.

Additionally, if the hole cut in the wall is too large, the yoke 10 of the electrical device 40 may be allowed to move backward until it meets the front face of the electrical box 50, thereby also creating a negative aesthetic and safety effects. In this instance, a great deal of time and effort may be expended in removing the electrical box 50 that has been installed in an oversized hole in the wall, positioning and installing a new electrical box 50, and reinstalling the electrical device 40. Accordingly, it is desirable to simply adjust the electrical device 40 so that it is solidly supported by the box and yet will be coincident with the front of the wall face 60 so that there is no visible gap between the electrical device 40 and the faceplate. It should be noted that the portions of the yoke 10 depicted in the figures are merely those portions of the yoke 10 that extend from the electrical device 40. The yoke 10 actually comprises more than just these depicted portions and extends from the portion of the yoke 10 depicted at one end of the electrical device 40, through the electrical device 40 itself, with the opposite end of the yoke 10 protruding from the other end of the electrical device 40. The particular yoke implementation of FIGS. 12 and 13 illustrate the complete yoke for an adjustable electrical device with the other electrical device portions removed for convenience of illustration.

Figure 3:
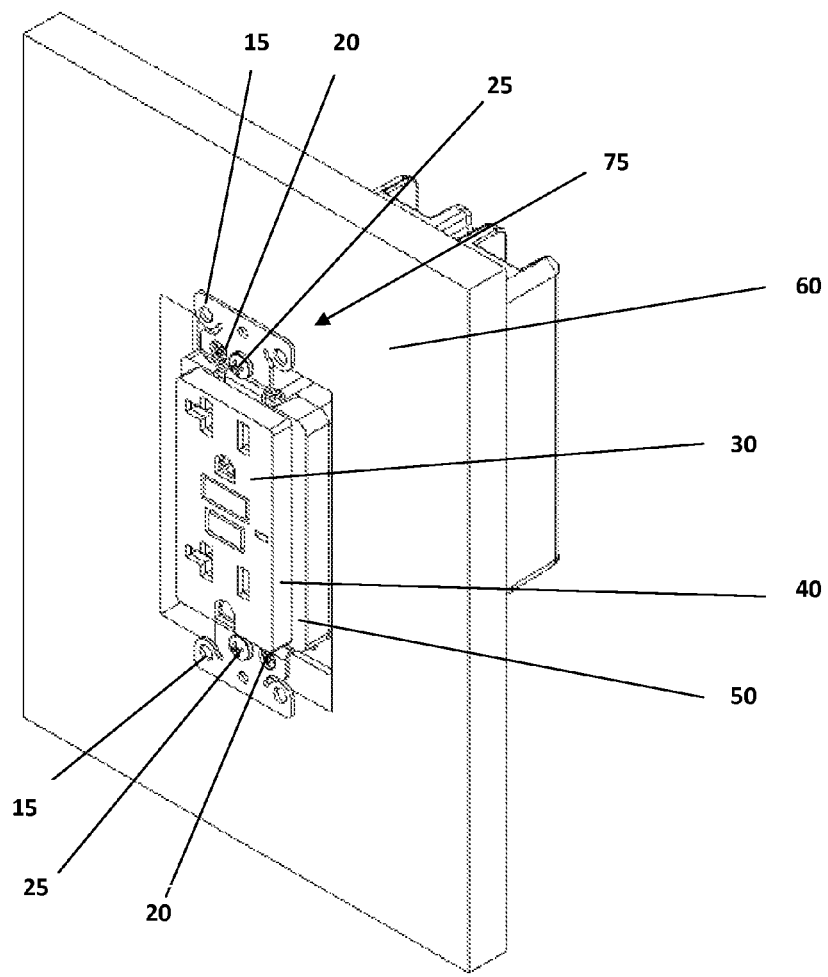
FIG. 3 depicts an installed electrical device having an adjustable mounting structure.
Figure 4:
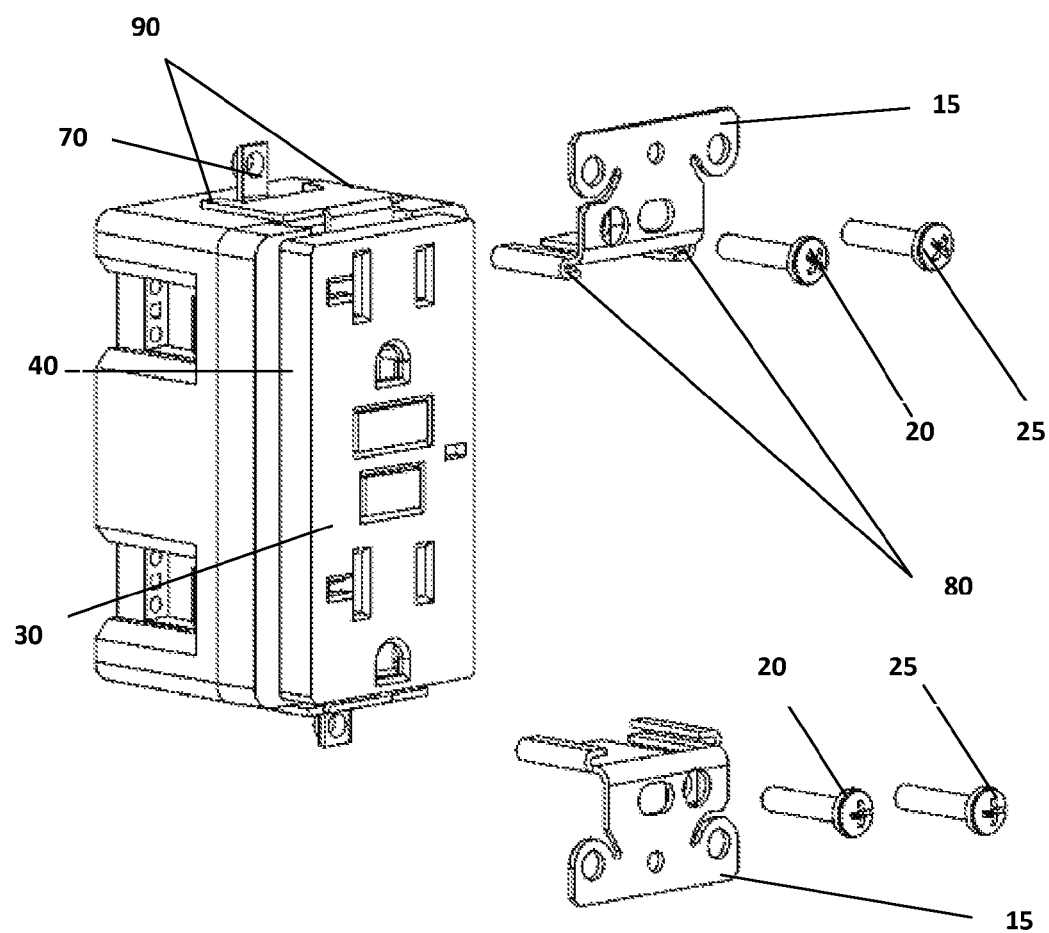
FIG. 4 depicts an exploded view of an electrical device with a first implementation of an adjustable mounting structure.
Figure 6:
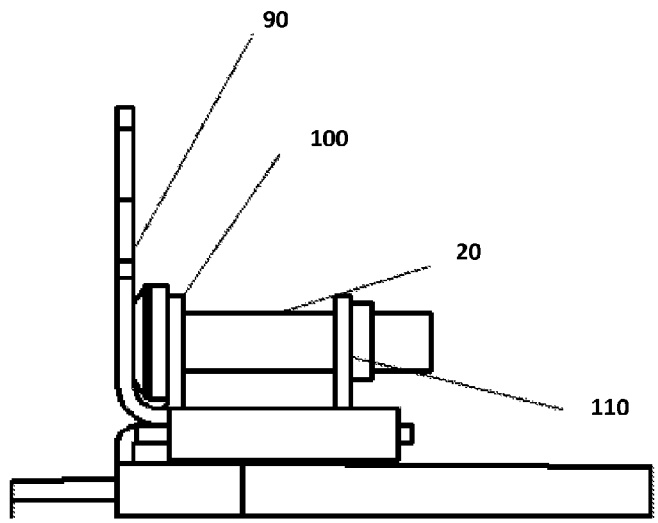
FIG. 6 depicts a close-up view of an adjustment structure of a particular implementation.

FIG. 3 depicts an application of a particular implementation of an adjustable mounting electrical device installed in place of the current state-of-the-art device shown in FIGS. 1 and 2 in an installation having the electrical box 50 set far back in the wall so that the front face of the electrical box is recessed behind the front face of the wall 60. The embodiment of FIG. 3 includes a moveable yoke 15 portion with an adjustment screw 20 laterally offset from the box mounting screw 25 that engages a fixed yoke 70 portion to allow the adjustable yoke 15 portion to move in relation to the fixed yoke 70 portion of the yoke 75. FIG. 4 shows an exploded view of the electrical device of FIG. 3 with the yoke 75 having both a moveable yoke 15 portion (moveable in relation to the electrical device) and a fixed yoke 70 portion (fixed in relation to the electrical device), and an adjustment screw 20 to allow for adjustment of the mounting of the electrical device 40. The moveable 15 and fixed yoke 70 portions may also be interconnected by rails 90 and tracks 80 as shown in FIGS. 4 and 6. Although not limited to this arrangement, the mounting screw 20 may be trapped between the back face 90 of the moveable yoke 15 portion and a rear bearing face 100 formed from the same yoke 15 portion. As a screwdriver is used to turn the adjustment screw 20, the head of the screw 20 remains in the gap between these two bearing surfaces 90, 100. The threaded boss 110 on the fixed yoke 70 portion then moves the fixed yoke 70 portion and the electrical device 40 forward or backward as the adjustment screw 20 is rotated. A box mounting screw 25 is located along a center axis of yoke 75, with the adjustment screw 20 located off-center to one side of the box mounting screw 25. The box mounting screw 20 is aligned with the box mounting screw apertures of a conventional electrical outlet box.

Figure 5A:
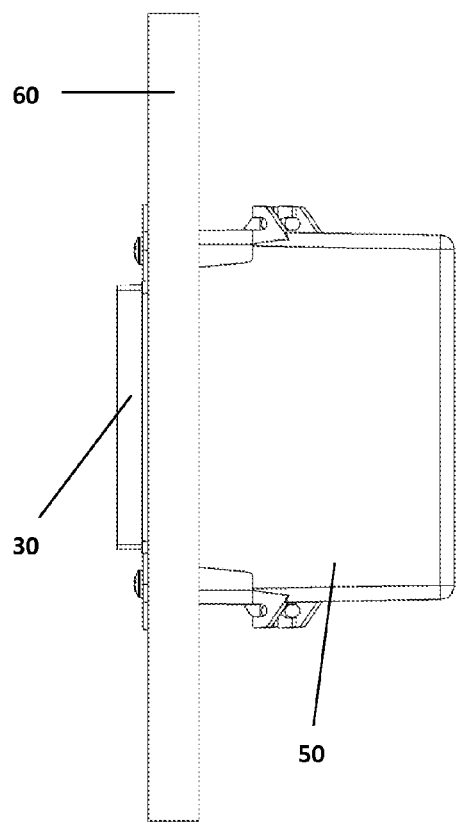
FIGS. 5A & 5B depict installations of an electrical device at different adjusted depths.
Figure 5B:
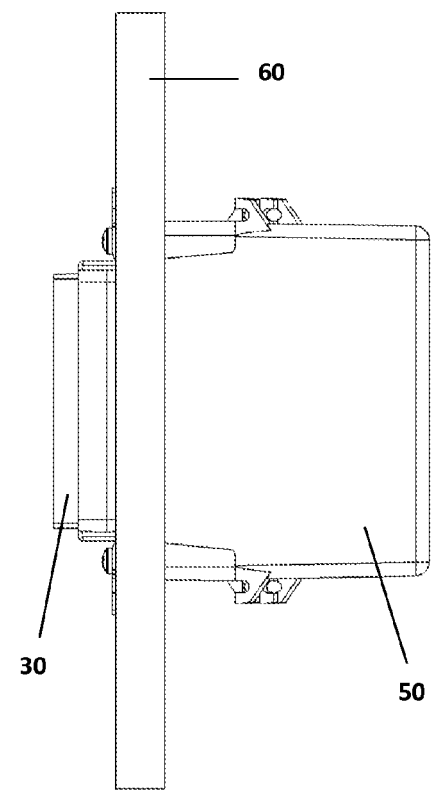

FIGS. 5A and 5B depict implementations of an implementation of an adjustable mounting electrical device wherein the electrical device 40 (FIG. 4) is, respectively, closer to and further away from the wall face 60. This movement is accomplished by adjustment of the adjustment screw 20 (FIGS. 4 and 8-11).

FIG. 6 depicts a close-up view of a basic adjustment structure for an electrical device yoke. As the adjustment screw(s) 20 are turned, the electrical device 40 (FIG. 4) moves forward and backward in kind. While two adjustment screws 20 may be used in particular implementations, any other number of adjustment screws 20, including only one adjustment screw in particular implementations, may also be used in various other configurations. For electrical boxes 50 (FIG. 1) that are installed at an angle relative to the wall, having two adjustment screws 20 may allow for the electrical device 40 to be adjusted to a greater extent on either the top or bottom as desirable from the angle of installation.

In other applications, it may be more desirable to use only one adjustment screw 20. In this instance, the moveable yoke 15 portions and fixed yoke 70 portions may need to be fastened or tied together on one side of the electrical device 40. This would allow the fixed yoke 70 portion structure and the electrical device 40 to move relative to the moveable yoke 15 portion. As per the National Electrical Code, the yokes and box mounting screws 25 must all be bonded to ground and the center mounting screw 26 must thread into the fixed yoke 70 portions to ensure that metallic faceplates are also bonded to ground. To comply with the National Electrical Code, one of the yokes will also have a ground screw threaded into it so that an equipment grounding conductor or a grounding wire may be connected.

Figures 7A, 7B:
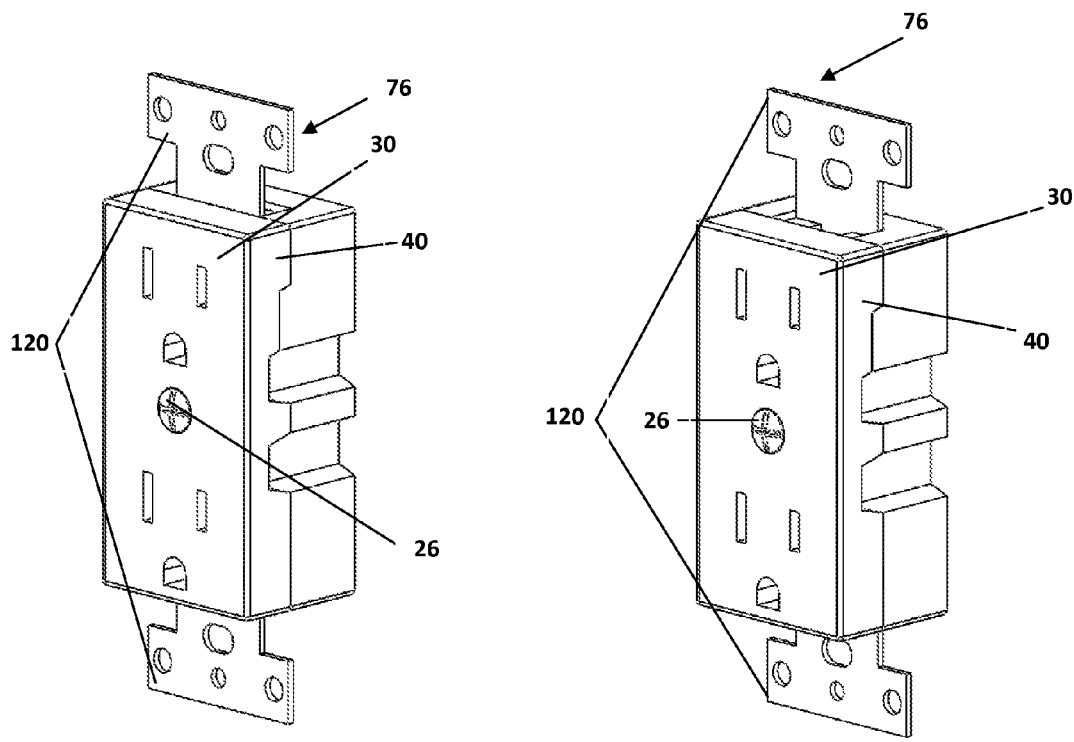
FIGS. 7A & 7B depict perspective views of a first particular embodiment of an adjustable mounting electrical device.
Figure 10C:
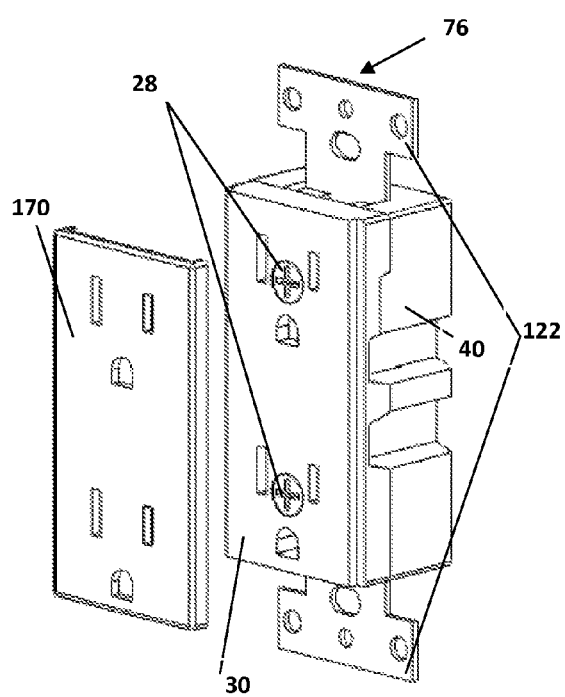
Figure 10D:
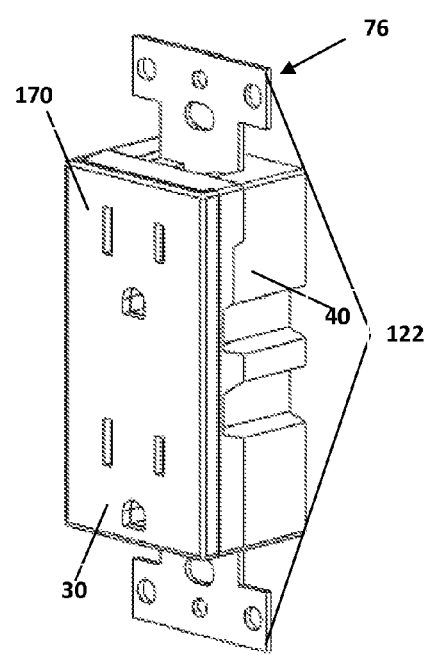
Figure 11A:
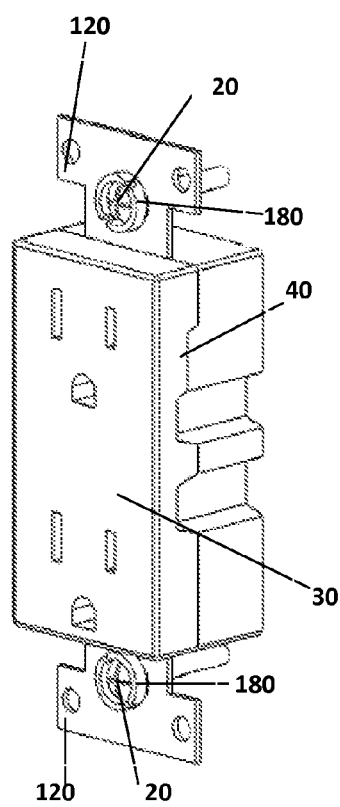
FIGS. 11A & 11B depict perspective views of a fifth particular embodiment of an adjustable mounting electrical device.
Figure 11B:
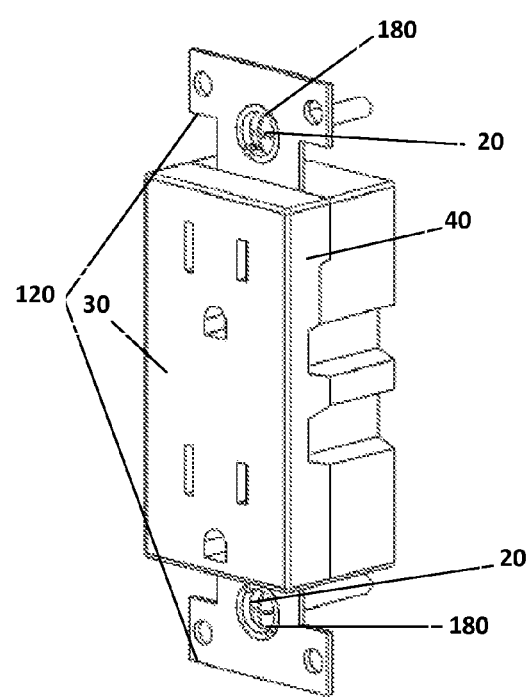

FIGS. 7A and 7B depict another application of an adjustable mounting electrical device wherein a center adjustment screw 26 correspondingly adjusts the yoke 76 mounting flanges 120 of the electric device forward and backward in a direction perpendicular to the front 30 of the electrical device 40 and the front face of the electrical box 50. By trapping the horizontal positioning of the center adjustment screw 26 in relation to the front 30 of the electrical device, twisting the center adjustment screw 26 which is threadedly engaged with the yoke 76 causes the adjustable yoke 120 portions (mounting flanges) to move in relation to the fixed yoke portions. FIG. 7A shows the forward position and FIG. 7B shows the backward position.

FIGS. 8A through 8D depict another particular implementation of an adjustable mounting electrical device having a center adjustment screw 26 that correspondingly adjusts the yoke mounting flanges 120 forward and backward in a direction perpendicular to the front 30 of the electrical device 40 and the front face of the electrical box 50, similar to that of FIGS. 7A and 7B, but further including a center flap 130 or detachable cover that conceals the adjustment screw 26 from view when it is not in use.

FIGS. 9A and 9B depict a particular implementation of an adjustable mounting electrical device wherein the electrical device 40 has a front shell 140 and a back shell 150 in addition to one or more mounting flanges 122 of the yoke 76. The back shell 150 and mounting flanges 120 are moveable on a track 160 that runs between the front 140 and back shells 150 when one or more side buttons 155 are depressed to allow for free movement along the track 160. The front shell 140 of this particular implementation is adjustable in relation to the yoke 76 by a user squeezing the opposing depressible side buttons 155 on either side of the front 30 of the electrical device 40 to temporarily release the front shell 140 from its fixed relationship to the back shell. Release of the opposing side clips 155 causes the clip structure to re-engage the back shell 150 and fix the position of the front shell 140 in relation to the back shell.

FIGS. 10A through 10D depict an application of an adjustable mounting electrical device having a false front face or cover plate 170 the snaps onto the front face 30 of the electrical device 40 to conceal the adjustment screws 28 or other mechanism from view. This particular implementation uses two screws adjustment screws 28 that allow adjustment of the mounting flanges 122 of the yoke 76 to move forward and backward in a direction perpendicular to the front face 30 of the electrical device 40. By using two separate adjustment screws 28, both the top and the bottom of the electrical device can be adjusted separately.

The particular yoke implementation of FIGS. 12 and 13 illustrate a yoke 205 with the other electrical device portions removed for convenience of illustration. This particular yoke implementation can be used with an adjustable mounting electrical device having a threaded, plate screw hole 200 that allows for solid seating and correct placement of the plate screw relative to the electrical box 50 (FIG. 2) regardless of whether the front face of the electrical box 50 is flush with the wall surface 60 (FIG. 2) or the electrical box 50 has been installed too far back in the wall, thereby preventing the yoke 205 from sitting on the front of the wall surface 60. Because the plate screw hole 200 is fixed in relation to the yoke 205 and does not move with the adjustable yoke 15 portions, the plate screw hole 200 is in correct placement for a face plate after the adjustable yoke 15 portions have been adjusted. Although not limited to this configuration, this and other implementations of an adjustable mounting electrical device are depicted here as having a box mounting screw 190 located at approximately the center of yoke 205 and an adjustment screw 20 located off-center to one side of the box mounting screw 190. Similar to the embodiment illustrated in FIG. 4, the off-center adjustment screw 20 threadedly engages the fixed yoke 70 portions of an electrical device to allow the adjustable yoke 15 portion of the yoke 205 to adjust in relation to the electrical device. The box mounting screw 190 is aligned with the box mounting screw apertures of a conventional electrical outlet box. Those of ordinary skill in the art will readily understand how to apply the principles associated with this particular yoke 205, illustrated in FIGS. 12 and 13, to the various other implementations illustrated herein and in other implementations of electrical devices known in the art.

We claim:

1. An adjustably mounting electrical device comprising:
   an electrical device configured for mounting in an electrical box, the electrical device comprising an electrical device face;
   one or more fixed yoke portions fixedly coupled to the electrical device and located perpendicularly to the electrical device face;
   one or more moveable yoke portions slidably coupled to the electrical device and located perpendicularly to the electrical device face;
   one or more adjustment screws inserted through the one or more moveable yoke portions and threaded into the one or more fixed yoke portions, the one or more adjustment screws configured to slidably move the one or more moveable yoke portions perpendicularly to the electrical device face; and
   one or more box mounting screws located along a center axis of the one or more moveable yoke portions, the one or more adjustment screws threadedly coupled to the one or more fixed yoke portions at a point that is laterally displaced from the location of the one or more box mounting screws.

2. The electrical device of claim 1, wherein the one or more moveable yoke portions is configured to be adjusted so that the electrical device face is coplanar with a front face of a wall when the electrical device is mounted in the electrical box.

3. The electrical device of claim 1, wherein the electrical device having only one adjustment screw wherein the fixed and moveable yoke portions are attached to each other on a side of the device not having the adjustment screw.

4. The electrical device of claim 1, wherein the one or more fixed yoke portions have one or more tracks and the one or more moveable yoke portions have one or more rails, the one or more tracks interconnectable with the one or more rails.

5. The electrical device of claim 1, wherein the electrical device is an electrical receptacle.

6. The electrical device of claim 1, wherein the electrical device is an electrical switch or a dimmer.

7. The electrical device of claim 1, further comprising one or more threaded plate screw holes fixed in positional relation to the electrical device face, wherein the one or more adjustment screws is configured to slidably move the one or more moveable yokes perpendicularly to the electrical device face without moving the threaded plate screw holes in relation to the electrical device face.

8. The electrical device of claim 1, wherein the one or more fixed yoke portions have one or more tracks and the one or more moveable yoke portions have one or more rails, the one or more tracks interconnectable with the one or more rails.

* * * * *